Oct. 2, 1945.  G. E. EHRLING  2,386,097
COUPLING
Filed Oct. 18, 1941  5 Sheets-Sheet 1

INVENTOR
Gunnar E. Ehrling.
BY Gray and Smith
ATTORNEYS.

Oct. 2, 1945.  G. E. EHRLING  2,386,097
COUPLING
Filed Oct. 18, 1941  5 Sheets-Sheet 2
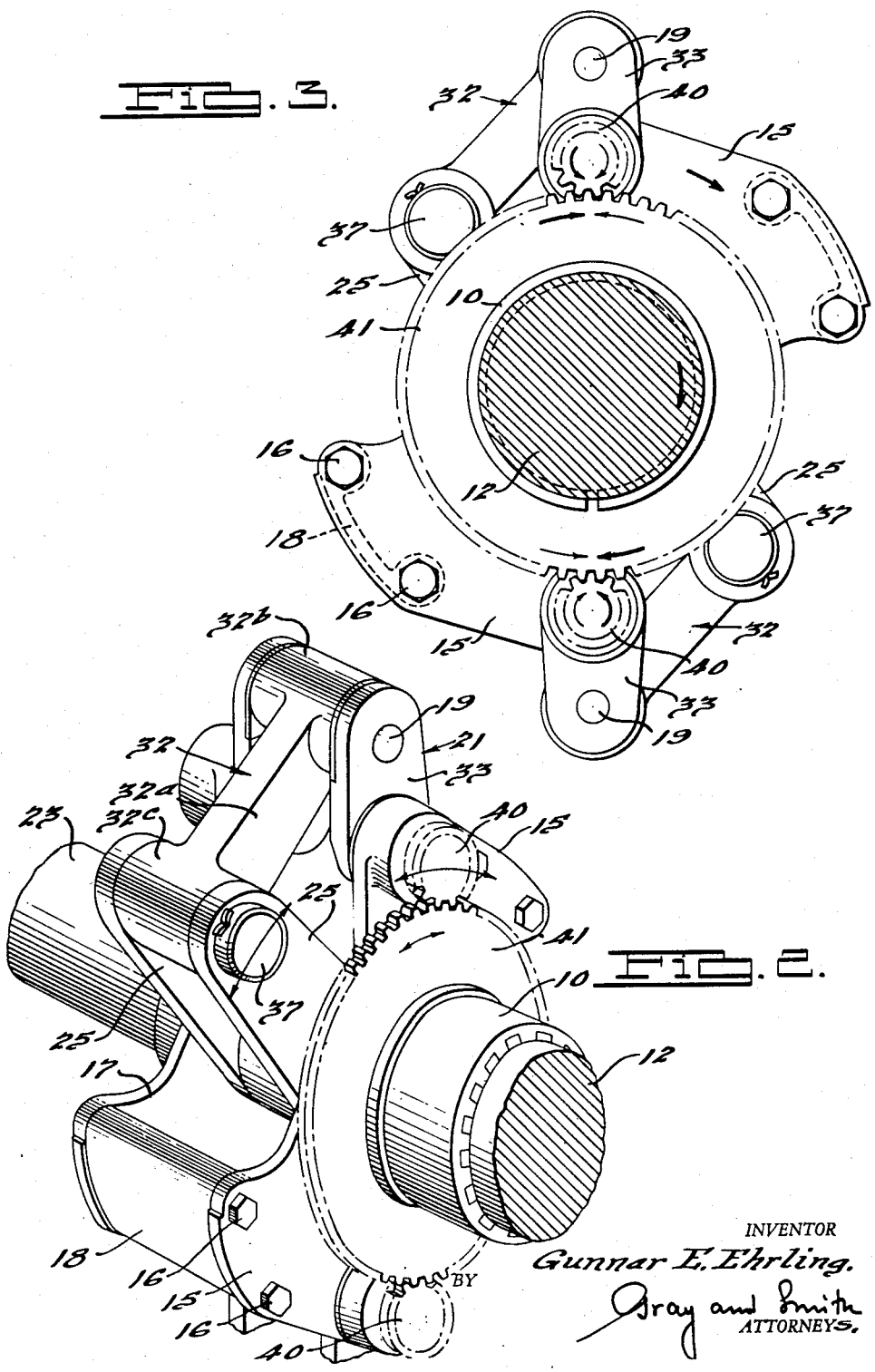
INVENTOR
Gunnar E. Ehrling.
BY Gray and Smith
ATTORNEYS.

Oct. 2, 1945.     G. E. EHRLING     2,386,097
COUPLING
Filed Oct. 18, 1941     5 Sheets-Sheet 3

INVENTOR
Gunnar E. Ehrling.
BY Gray and Smith
ATTORNEYS.

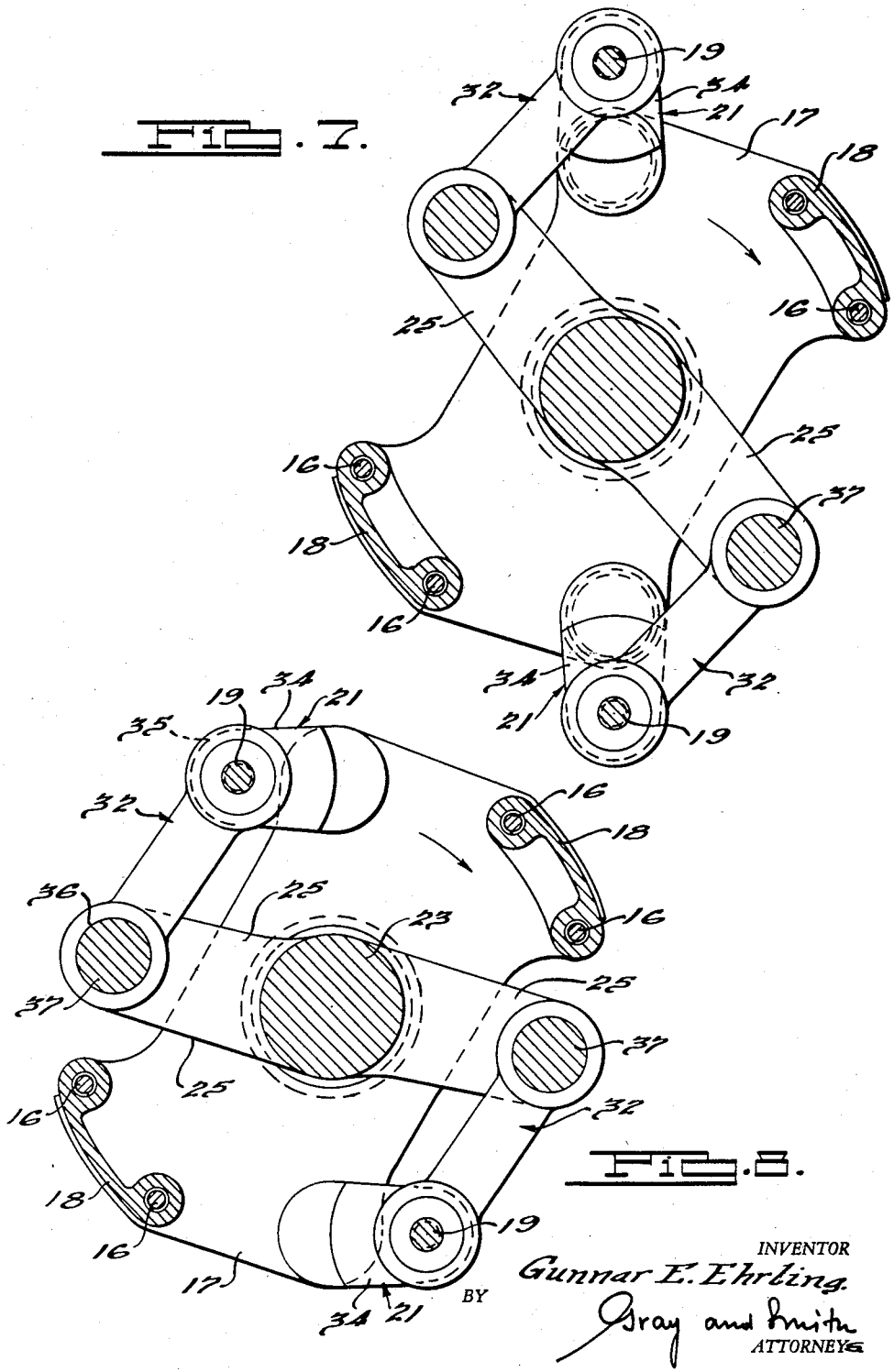

Oct. 2, 1945.  G. E. EHRLING  2,386,097
COUPLING
Filed Oct. 18, 1941  5 Sheets-Sheet 5
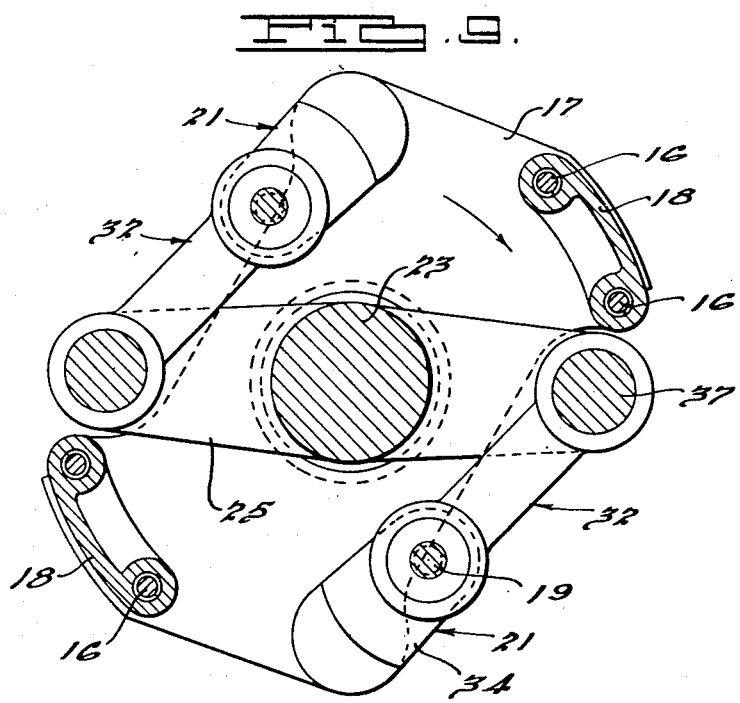
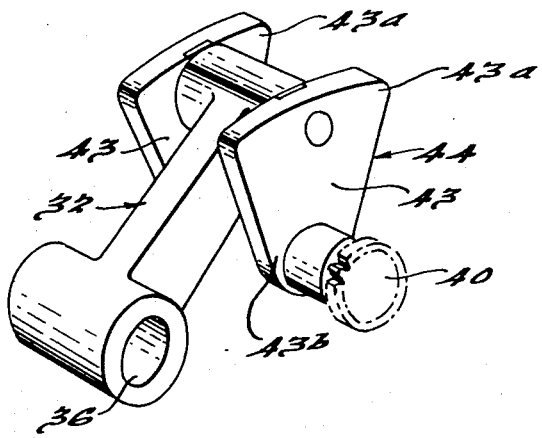
INVENTOR
Gunnar E. Ehrling
BY Gray and Smith
ATTORNEYS.

Patented Oct. 2, 1945

2,386,097

UNITED STATES PATENT OFFICE 2,386,097

COUPLING

Gunnar E. Ehrling, Detroit, Mich., assignor to Briggs Manufacturing Company, Detroit, Mich., a corporation of Michigan Application October 18, 1941, Serial No. 415,511

17 Claims. (Cl. 64—25)

This invention relates to shaft couplings adapted to be operatively interposed between two shafts arranged in substantially axial alignment. More particularly the invention relates to an improved coupling including dampening or vibration eliminating means and adapted for use in structures wherein pulsating torque is developed and is to be transmitted to operative parts for driving the same at uniform or nearly uniform speeds, such for instance as in cases of internal combustion engines, particularly such engines wherein use of heavy flywheels is impractical.

One of the objects of the present invention is to provide an improved coupling, particularly but not exclusively adapted for use in internal combustion engines, especially of the aviation or aircraft type.

Another object of the invention is to provide an improved coupling adapted to be operatively interposed between the crankshaft of an aviation engine and the propeller reduction gears driven by said engine.

A further object of the invention is to provide an improved coupling for a propeller driving engine, which is adapted to smooth out and eliminate torque pulsations and to deliver power to the reduction gears and the propeller in smooth and uniform flow, thereby permitting use of lighter propellers and also eliminating failures of propellers and reduction gears.

A still further object of the invention is to provide an improved resilient coupling for an aviation engine, in which there exists in operation an approximately straight line relationship between the relative rotation of the connected shafts and the torque transmitted.

A still further object of the invention is to provide an improved coupling for an aircraft engine, means being provided to limit the relative motion of the connected shafts in order to prevent excessive deflection as well as means for transmitting torque in the reverse direction when in flight the propeller tends to drive the engine.

A still further object of the invention is to provide an improved coupling for drivingly connecting two shafts, means being provided whereby said shafts are positively connected for transmission of mechanical energy until the rotative speed of said shafts reaches a predetermined speed.

A still further object of the invention is to provide an improved coupling including centrifugally actuated linkages which are so interconnected as to assist each other in operation, and in which the possibility of operative parts remaining at dead centers is eliminated.

A still further object of the present invention is to provide an improved shaft coupling of the foregoing character having resilient means of a dynamic character and in which springs, rubber blocks and similar members found to cause severe wabbling and chattering, particularly at certain speeds, are eliminated.

It is an added object of the present invention to provide an improved structure of the foregoing character which is simple, compact and relatively light in construction, safe and dependable in operation, and relatively inexpensive to manufacture.

Other objects of this invention will appear in the following description and appended claims, reference being had to the accompanying drawings forming a part of this specification wherein like reference characters designate corresponding parts in the several views.

Fig. 2 is a perspective view illustrating in section the coupling shown in Fig. 1.

Fig. 3 is an end view of the structure shown in Fig. 2, the observer being presumed to look from the crankshaft end of the coupling.

Fig. 7 is a sectional view taken in the direction of the arrows on the section plane passing through the line 7—7 of Fig. 1 and illustrating the relative positions of the operative parts of the coupling at high speed operation thereof.

Fig. 8 is a view similar in part to Fig. 7 and illustrating the relative positions of the operative parts of the coupling when torque is transmitted therethrough at an intermediate speed of the operative speed range.

Fig. 9 is a view similar in part to Figs. 7 and 8 and illustrating the relative positions of the operative parts of the coupling when torque is transmitted therethrough at a low speed.

Fig. 10 shows in perspective one linkage of the connecting part of the coupling, this view illustrating a slight modification.

Figure 1:
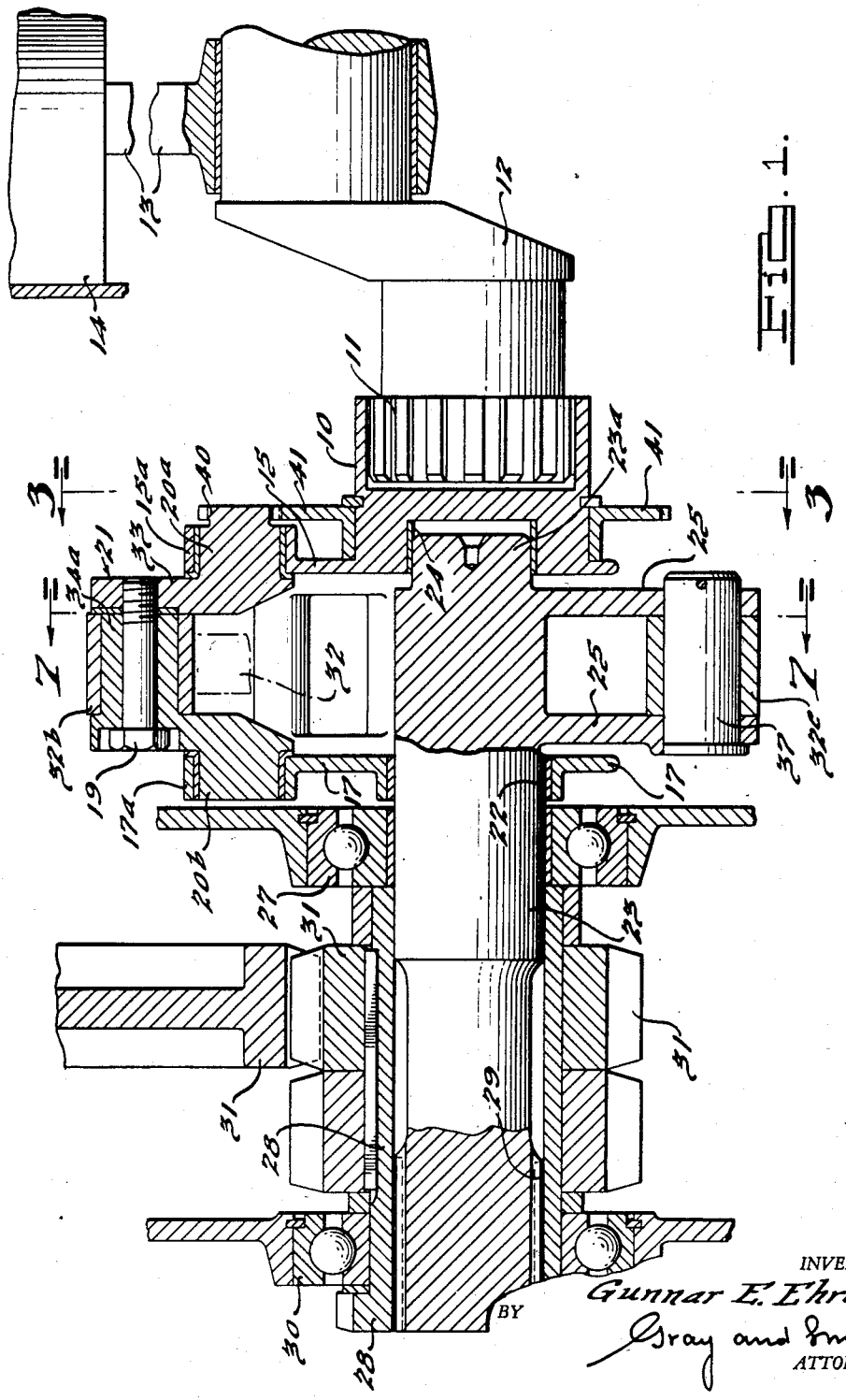
Fig. 1 is a longitudinal view illustrating in section a portion of an engine and a coupling embodying the present invention connecting the crankshaft of the engine with the propeller reduction gear shaft.

Before explaining in detail the present invention it is to be understood that the invention is not limited in its application to the details of construction and arrangement of parts illustrated in the accompanying drawings, since the invention is capable of other embodiments and of being practiced or carried out in various ways. Also it is to be understood that the phraseology or terminology employed herein is for the purpose of description and not of limitation.

In the drawings there is shown, by way of example, a coupling adapted to be operatively interposed between a driving and a driven shaft for transmission of rotative effort or mechanical energy between said shafts in either direction. The coupling hereinafter described in detail is adapted for use between two rotatable shafts wherein the driving shaft is delivering pulsating torque and where it is necessary to eliminate said pulsations in order to preserve the parts connected to the driven shaft, such for instance as trains of gears and the like. Although the coupling may be used in any instance wherein the above specified conditions exist, it is particularly adapted for use in aircraft power plants having a driving shaft receiving pulsating torque, such for instance as that which is delivered by an internal combustion engine, and delivering said torque to the reduction gearing adapted to drive the propeller.

The coupling comprises generally a plurality of linkages, two of them being used in the present instance to produce a balanced device, which linkages connect drivingly the driving and the driven shafts and permit varying angular displacement therebetween. At the low speed of the engine said linkages are adapted to align themselves in such a way that when a maximum angular displacement between said shafts occurs, they are connected for transmission of driving force positively. Means are provided whereby as the speed of the shafts increases the linkages are moved by the action of the centrifugal force into respective positions to decrease the angular displacement between the shafts. Since in aircraft operation the torque necessary to drive the propeller usually increases as the square of the speed thereof, and the centrifugal force also increases in a square relation to the speed, the torque and the centrifugal force may be balanced with a small correction factor, and this in turn enables in accordance with the present invention, the attainment of a substantially uniform angular displacement between the connected shafts through the entire operative range of torque and speeds.

Referring to Fig. 1 of the drawings, the coupling is provided with a sleeve 10 connected by splining as indicated at 11 to the end of the driving or crankshaft 12 actuated by a plurality of connecting rods 13, only one connecting rod being shown in the drawings. Such connecting rods are actuated by pistons of any suitable engine, one of such pistons being indicated in Fig. 1 by the numeral 14.

The coupling embodying the present invention and shown in longitudinal section in Fig. 1 is illustrated in perspective in Fig. 2. For the purposes of description and better understanding of the coupling, the same may be divided into three distinct parts. The first part may be termed "the driver part," and it is illustrated in an exploded view in Fig. 4. The second part may be termed "the driven part," and it is illustrated in Fig. 5. The third part may be termed "the connecting part," and it is illustrated in Fig. 6. The driver part and the driven part are rigid structures and they are positively connected to the driving and to the driven shafts respectively. They may be either permanently or detachably secured to the respective shafts, or integrally formed thereon. The connecting part consists of two linkages which resiliently connect the driver and the driven parts. The resiliency of the connecting part is of a purely dynamic character, and said connecting part does not include any springs, rubber blocks and the like which have been found objectionable for several reasons and especially because of promoting severe wabbling and vibration at low speed particularly when the engine is just starting.

Figure 4:
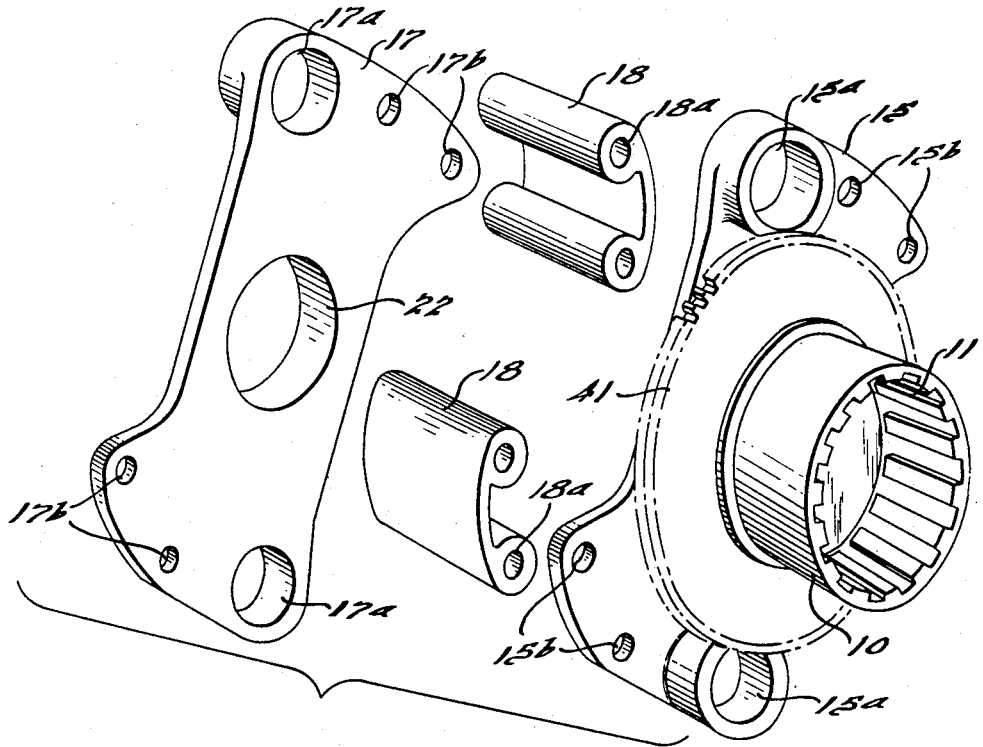
Fig. 4 is an exploded view showing the driver part of the coupling.
Figures 5, 6:
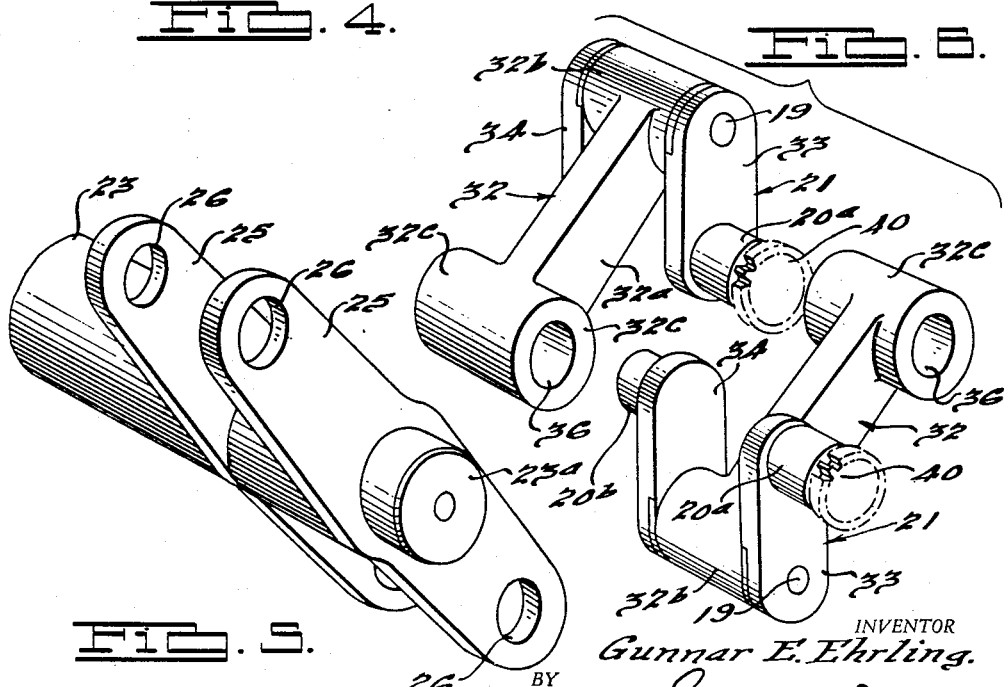
Fig. 5 is a perspective view showing the driven part of the coupling formed on the end of the driven shaft.
Fig. 6 is an exploded view showing in perspective the connecting part of the coupling, said part including two linkages connecting the driver part and the driven part shown respectively in Figs. 4 and 5.

Referring particularly to Figs. 2 and 4, the driver part comprises the sleeve 10 connected to the crankshaft of the engine as mentioned. To the sleeve 10 there is secured or integrally formed thereon, as in the present embodiment of the invention, a crank plate 15 to which is secured by means of bolts 16 a second crank plate 17, spacer pieces 18 being interposed between said crank plates to effect predetermined spacing between said plates. The crank plates have pairs of apertures 15b and 17b which aline with the pairs of holes 18a in the spacer members and through which the bolts 16 pass. Said crank plates 15 and 17 are arranged in planes substantially perpendicular to the axis of the connected shafts. In each of the crank plates 15 and 17 there is provided a number of bearing portions 15a and 17a, in the present instance two, adapted to receive for journaling therein the shaft ends 20a and 20b of the crank links 21 as hereinafter described. By virtue of such a construction there is provided in effect on said sleeve 10 two diametrically opposed cranks, said cranks in the present instance being of recessed construction and of double type. The crank plates 15 and 17 operate in effect as a single double type crank, and hence it will be understood that instead of providing two crank plates 15 and 17, only one of such plates or the equivalent may be provided. However, provision of two axially spaced plates presents a better construction for the reasons which will become apparent as the mechanism is described further. It should be noted, however, that provision of two plates 15 and 17 instead of one plate only does not effect the character of said plates both of which present two diametrically opposed cranks, both of said cranks being incorporated in each plate. The plate 17 is provided with a centrally located hole 22 for the passage of the driven shaft 23. The end portion of this shaft, designated by the numeral 23a, is received in the pilot bearing 24 provided in the plate 15 and sleeve 10 as best shown in Fig. 1.

On the driven shaft 23 there are formed two crank members 25, said members when taken together presenting in effect two diametrically opposed cranks each having a radial recess, and provided with holes 26 on their outer ends. Again as in the case of plates 15 and 17, only one crank member 25 may be used. However, using two members 25 presents a more desirable construction. In the assembled condition of the coupling the members 25 are disposed between the plates 15 and 17 as can be best understood from an examination of Figs. 1 and 2. Adjacent the plate 17 the driven shaft 23 is supported in a bearing 27 preferably of the ball or roller type. This driven shaft 23 carries a sleeve 28 drivingly connected thereto in any suitable way such, for instance, as by splining as indicated at 29. The sleeve 28 is in turn supported in a ball bearing 30, and in the present embodiment of the invention it carries a number of propeller reduction gears indicated by numerals 31, drivingly secured to the sleeve 28.

The part connecting the driver and the driven parts is best illustrated in Fig. 6. The connecting part comprises two similar linkages, each of them including an articulated crank link 21 and a rod link 32. Each of said articulated links 21 comprises two spaced and parallely arranged side pieces 33 and 34. The side piece 33 is provided with a shaft portion 20a formed preferably integral with it, which shaft portion has an end on which there is secured or integrally formed, as is the case in the present instance, a gear 40. The side piece 34 is provided on one of its ends with a shaft portion 20b coaxial with the shaft portion 20a of the side piece 33. On the opposite end of the side piece 34 there is formed (see Fig. 1) a cylindrical portion 34a having a hole for reception of the screw 19. Each of said rod links 32 includes a shank portion 32a having bearing portions 32b and 32c formed on its ends, said bearing portions being provided with cylindrical bores 35 and 36 respectively. The bore 35 is adapted to receive and to journal therein the cylindrical portion 34a as is best shown in Fig. 1. The screw 19 securing together the side pieces 33 and 34 of the articulated crank link 21 also hingedly connects said link 21 to its respective rod link 32, thus forming one of said two similar linkages illustrated in Fig. 6.

For operatively connecting the driver and the driven parts of the device, each of said linkages is connected to the driver and to the driven part respectively. Such connection with the driver part is effected by the plate 15 receiving the shaft portion 20a in a bearing 15a, and the plate 17 receiving the shaft portion 20b in a bearing 17a (see Fig. 1). Plates 15 and 17 are, in turn, connected together with the aid of the screws 16 passing through the holes 18a of the spacer member 18 (see Fig. 2). The connection of the linkages with the driven part is effected by the bearing end 32c of the rod link 32 of each linkage being arranged between the ends of the member 25 to cause the holes 26 thereof to register with the hole 36 of said end 32c (see Figs. 5 and 1) for receiving a connecting pin 37.

In operation, when rotative effort or torque is transmitted from the driving shaft to the driven shaft and the driver plates 15 and 17 exert pull on the crank members 25 through links 21 and 32, said links tend to align themselves substantially along a straight line as indicated in Fig. 9. If links 21 and 32 had no weight, such condition would prevail through the entire operative range of the engine speeds, and the driver and the driven parts would be positively connected throughout said entire range. However, due to the effect of the centrifugal force on the links 21 and 32 as well as on the screw 19, as the speed of the engine increases the connected portions of the links 21 and 32 are moved outwardly and the links tend to move toward the positions shown in Fig. 7. It will be understood, however, that Fig. 7 illustrates the extreme position, and that under actual operative conditions the link 21 does not quite reach the true radial position shown in said figure. With one particular engine good results have been obtained with links that come at the maximum speed of the engine, which is approximately 4500 R. P. M., within 30° from the true radial position. In positions illustrated in Fig. 9 the driven and the driving shafts have substantially maximum relative angular displacement, while in positions of the linkages illustrated in Fig. 7, with the crank link being disposed substantially radially, the driving and the driven shafts have substantially minimum relative angular displacement. It will now be understood in view of the foregoing that the positions of the linkages for any definite moment of operation depend upon the dynamic balance between the forces of the driving torque acting on said linkages and tending to move them into the positions shown in Fig. 8, and the centrifugal force tending to move the linkages outwardly into the positions shown in Fig. 7. When this balance occurs, the operation of the coupling becomes more or less uniform at some intermediate position between the extreme positions (position of Fig. 8 for instance) but any vibrations or pulsations which tend to occur are resisted by the inertia of the weight portions of the links 21 and 32 and are largely absorbed in the process of changing the angular displacement between the driving and the driven shafts. By virtue of such a construction a resilient transmission of driving force is effected. It is an important advantage of the present invention that resiliency of transmission of the driving force is effected with means of dynamic character and without resort to resilient means of mechanical character such as springs, rubber members, and the like.

In accordance with the invention there are provided means interconnecting said linkages in order that they will be positively held in constant relative position. In the present embodiment of the invention said means are of gear type and are exemplified by two driving gears or pinions 40 secured to the shaft ends 20 of the crank links 21, both of said gears meshing with a connecting gear 41 mounted on the sleeve 10 for independent rotation thereon, as is best shown in Figs. 1, 2 and 6.

Referring now to Fig. 3 of the drawings, and presuming that the rotation of the driving shaft is in the clockwise direction as indicated on said Fig. 3, the action of the torque or driving force on the members of the coupling is indicated in heavy arrows. As can be clearly seen from an examination of Fig. 3, the driver plate 15 will rotate in clockwise direction. The action of the torque on the gears 40 and gear 41 is indicated in heavy arrows and as can be clearly seen, both of the linkages tend to rotate the gears 40 in a counterclockwise direction, said gears rotating the connecting gear 41 in the clockwise direction. The above tendency is due to the action of the torque. On the other hand, the action of the centrifugal force on the linkages tends to rotate the gears 40 in the clockwise direction and said gears 40 tend to rotate the connecting gear 41 in a counterclockwise direction as indicated by the light arrows in said Fig. 3. The position of the gear 41 for any particular moment depends on the balance of forces acting in the above described manner.

Fig. 10 illustrates one linkage of the connecting part of the coupling, corresponding to the linkages of Fig. 6 but of a modified construction enabling attainment of additional advantages. In the linkage of said Fig. 10 the side pieces 43 of a crank link 44 corresponding to the crank link 21 of the structure shown in Fig. 6 have their outer ends 43a made heavier than their inner ends 43b. In its other particulars the linkage of Fig. 10 corresponds to the linkages of Fig. 6. By virtue of such a construction the center of gravity of the entire crank link 44 is moved outwardly for a sufficient distance to increase materially the moment of inertia of the link 44 and to produce the desired regulatory effect within limited radial dimensions of the coupling. This feature is important in constructions such as aircraft where space requirements are extremely rigid.

There is thus provided an improved coupling construction for connecting two axially alined shafts, with the aid of which undesirable operation vibrations of the torsional type may be absorbed by the coupling, and numerous advantages and the objects of the present invention are obtained. The absorption of torsional vibrations is effected in said structure with the aid of interconnected linkages assuming in operation positions resulting from dynamic balance effected by the mutually opposing actions of the torque and centrifugal force of rotation.

I claim:

1. A coupling adapted to be operatively interposed between a driving shaft and a driven shaft for transmission of rotative effort, said coupling including a driver part drivingly connected to the driving shaft and including two diametrically arranged cranks, a driven part including two diametrically opposed cranks drivingly connected to the driven shaft, and a connecting part including two linkages, each of said linkages comprising a link having one end pivotally connected to the driving crank and a link having one end pivotally connected to the driven crank, the opposite ends of said links being pivotally connected together, the links of each linkage being adapted to tend to align themselves along a straight line when rotative effort is transmitted at low speed and to have their connected ends moved outwardly by the action of centrifugal force as the speed increases, and a positive driving connection between said linkages separate from said cranks for connecting the linkages together.

2. A coupling adapted to be operatively interposed between a driving shaft and a driven shaft for transmission of rotative effort, said coupling including a driver part drivingly connected to the driving shaft and including two diametrically arranged cranks, a driven part including two diametrically opposed cranks drivingly connected to the driven shaft, and a connecting part including two linkages, each of said linkages comprising a link having one end pivotally connected to the driving crank and a link having one end pivotally connected to the driven crank, the opposite ends of said links being pivotally connected together, the links of each linkage being adapted to tend to align themselves along a straight line when rotative effort is transmitted at low speed and to have their connected ends moved outwardly by centrifugal force in opposition to said first tendency as the speed increases, and gear means drivingly interconnecting said linkages.

3. A coupling adapted to be operatively interposed between a driving shaft and a driven shaft for transmission of rotative effort, said coupling including a driver part drivingly connected to the driving shaft and including two diametrically arranged cranks, a driven part including two diametrically opposed cranks drivingly connected to the driven shaft, and a connecting part including two linkages, each of said linkages comprising a link having one end pivotally connected to the driving crank and a link having one end pivotally connected to the driven crank, the opposite ends of said links being pivotally connected together, the links of each linkage being adapted to tend to align themselves along a straight line when rotative effort is transmitted at low speed and to have their connected ends moved outwardly by centrifugal force in opposition to said first tendency as the speed increases, and a train of gears drivingly interconnecting said linkages to assist each other in similar movements.

4. A coupling adapted to be operatively interposed between a driving shaft and a driven shaft for transmission of rotative effort, said coupling including a driver part drivingly connected to the driving shaft and including two diametrically arranged cranks, a driven part including two diametrically opposed cranks drivingly connected to the driven shaft, and a connecting part including two linkages, each of said linkages comprising a link having one end pivotally connected to the driving crank and a link having one end pivotally connected to the driven crank, the opposite ends of said links being pivotally connected together, said links being adapted to tend to align themselves along a straight line when rotative effort is transmitted at low speed and to have their connected ends moved outwardly by centrifugal force in opposition to said first tendency as the speed increases, a gear secured to the end of each link pivoted to the driving crank, and a connecting gear meshing with said gears for interconnecting said linkages.

5. A coupling adapted to be operatively interposed between a driving shaft and a driven shaft for transmission of rotative effort, said shafts being arranged in a substantially axial alignment, said coupling including a sleeve drivingly connected to the end of the driving shaft, a driving crank plate secured to said sleeve and having two diametrically opposed cranks formed thereon, two diametrically opposed cranks formed on the end of the driven shaft, and two connecting linkages for operatively connecting said cranks, each of said linkages comprising a link having one end pivotally connected to the driving crank and a link having one end pivotally connected to the driven crank, the opposite ends of said links being pivotally connected together, said links being adapted to tend to align themselves along a straight line when rotative effort is transmitted at low speed and to have their connected ends moved outwardly by centrifugal force in opposition to said first tendency as the speed increases, and means separate from said cranks for positively connecting the linkages together whereby the movement of the connected ends of the respective pairs of links will be uniform.

6. A coupling adapted to be operatively interposed between a driving shaft and a driven shaft for transmission of rotative effort, said shafts being arranged in a substantially axial alignment, said coupling including a sleeve drivingly connected to the end of the driving shaft, a driving crank plate secured to said sleeve and having two diametrically opposed cranks formed thereon, two diametrically opposed cranks on the end of the driven shaft, and two connecting linkages for operatively connecting said cranks, each of said linkages comprising a link having one end pivotally connected to the driving crank and a link having one end pivotally connected to the driven crank, the opposite ends of said links being pivotally connected together, said links being adapted to tend to align themselves along a straight line when rotative effort is transmitted at low speed and to have their connected ends moved outwardly by centrifugal force in opposition to said first tendency as the speed increases, and a train of gears drivingly interconnecting said linkages.

7. A coupling adapted to be operatively interposed between a driving shaft and a driven shaft for transmission of rotative effort, said shafts being arranged in a substantially axial alignment, said coupling including a sleeve drivingly connected to the end of the driving shaft, a driving crank plate secured to said sleeve and having two diametrically opposed cranks formed thereon, two diametrically opposed cranks formed on the end of the driven shaft, and two connecting linkages for operatively connecting said cranks, each of said linkages comprising a link having one end pivotally connected to the driving crank and a link having one end pivotally connected to the driven crank, the opposite ends of said links being pivotally connected together, said links being adapted to tend to align themselves along a straight line when rotative effort is transmitted at low speed and to have their connected ends moved outwardly by centrifugal force in opposition to said first tendency as the speed increases, a gear secured to the end of each link pivoted to the driving crank, and a connecting gear meshing with said gears for interconnecting said linkages.

8. A coupling adapted to be operatively interposed between a driving shaft and a driven shaft for transmission of rotative effort, said shafts being arranged in a substantially axial alignment, said coupling including a sleeve drivingly connected to the end of the driving shaft, a driving crank plate secured to said sleeve and having two diametrically opposed cranks formed thereon, two diametrically opposed cranks on the end of the driven shaft, and two connecting linkages for operatively connecting said cranks, each of said linkages comprising a link having one end pivotally connected to the driving crank and a link having one end pivotally connected to the driven crank, the opposite ends of said links being pivotally connected together, said links being adapted to tend to align themselves along a straight line when rotative effort is transmitted at low speed and to have their connected ends move outwardly by centrifugal force in opposition to said first tendency as the speed increases, two gears, one for each of said linkages, each of said gears being secured to the end of the respective link pivoted to the respective driving crank, and a connecting gear mounted on said sleeve for independent rotation and meshing with both of said gears.

9. A coupling adapted to be operatively interposed between a driving shaft and a driven shaft for transmission of torque, said shafts being arranged in substantial axial alignment, said coupling comprising a sleeve drivingly connected to the end of the driving shaft, two spaced driving crank plates secured to said sleeve, said driven shaft being journaled in said plates, two members secured to said driven shaft between said driving crank plates and forming in effect two diametrically opposed cranks longitudinally recessed, and two linkages, each comprising two links pivotally connected together and having their free ends pivotally connected to said driving and said driven cranks, and gear means connecting said linkages together for interconnected operation, said links being adapted to tend to align themselves substantially along a straight line for transmission of torque at low speeds, and to have their connected ends moved outwardly by the centrifugal force of rotation as the speed increases.

10. A coupling adapted to be operatively interposed between a driving shaft and a driven shaft for transmission of torque, said shafts being arranged in substantial axial alignment, said coupling comprising a sleeve drivingly connected to the end of the driving shaft, two spaced driving crank plates secured to said sleeve, said driven shaft being journaled in said plates, two members secured to said driven shaft between said driving crank plates and forming in effect two diametrically opposed cranks longitudinally recessed, and two linkages, each comprising two links pivotally connected together and having their free ends pivotally connected to said driving and said driven cranks, two gears, one for each linkage, each of said gears being secured to the end of the respective link pivoted to the respective driving crank and adapted to rotate in response to movements of said linkages, and a connecting gear mounted on said sleeve for independent rotation and meshing with both of said gears, said links being adapted to tend to align themselves substantially along a straight line for transmission of torque at low speeds, and to have their connected ends moved outwardly by the centrifugal force of rotation as the speed increases.

11. A coupling adapted to be operatively interposed between a driving shaft and a driven shaft for transmission of torque, said shafts being arranged in substantial axial alignment, said coupling comprising a sleeve drivingly connected to the end of the driving shaft, two spaced driving crank plates secured to said sleeve, said driven shaft being journaled in said plates, two members secured to said driven shaft between said driving crank plates and forming in effect two diametrically opposed cranks longitudinally recessed, and two linkages, each comprising two links pivotally connected together and having their free ends pivotally connected to said driving and said driven cranks, gear means connecting said linkages together for interconnected operation, said links being adapted to tend to align themselves substantially along a straight line for transmission of torque at low speeds, and to have their connected ends moved outwardly by the centrifugal force of rotation as the speed increases.

12. A centrifugal coupling adapted to be operatively interposed between a driving shaft and a driven shaft arranged along substantially the same axis, comprising a driving member drivingly connected to the driving shaft and having portions extending equal distances to opposite sides of the axis thereof, a driven member drivingly connected to the driven shaft and also having portions extending equal distances to opposite sides of the axis thereof, two pairs of links, the links of each pair being pivotally connected together and to the portions of said driving and driven members at one side of the shafts, the links of each pair being adapted to substantially align themselves when said shafts rotate at a predetermined speed, corresponding links of the pairs adapted to swing through arcs materially in excess of forty-five degrees, and means for positively connecting together said corresponding links for uniform motion.

13. A centrifugal coupling adapted to be operatively interposed between a driving shaft and a driven shaft arranged along substantially the same axis, comprising a driving member drivingly connected to the driving shaft and having portions extending equal distances to opposite sides of the axis thereof, a driven member drivingly connected to the driven shaft and also having portions extending equal distances to opposite sides of the axis thereof, two pairs of links, the links of each pair being pivotally connected together and to the portions of said driving and driven members at one side of the shafts, a gear secured to one link of each pair, and a gear connecting said gears.

14. A centrifugal coupling adapted to be operatively interposed between a driving shaft and a driven shaft arranged along substantially the same axis, comprising a driving member drivingly connected to the driving shaft and having portions extending equal distances to opposite sides of the axis thereof, a driven member drivingly connected to the driven shaft and also having portions extending equal distances to opposite sides of the axis thereof, two pairs of links, the links of each pair being pivotally connected together and to the portions of said driving and driven members at one side of the shafts, a relatively small gear secured to one link of each pair, and a relatively large gear connecting said small gears.

15. A centrifugal coupling adapted to be operatively interposed between a driving shaft and a driven shaft arranged along substantially the same axis, comprising a driving member drivingly connected to the driving shaft and having portions extending equal distances to opposite sides of the axis thereof, a driven member drivingly connected to the driven shaft and also having portions extending equal distances to opposite sides of the axis thereof, two pairs of links, the links of each pair being pivotally connected together and to the portions of said driving and driven members at one side of the shafts, a relatively small gear secured to one link of each pair, and a relatively large gear on said driving shaft connecting said small gears.

16. In a coupling for connecting together a driving shaft and a driven shaft arranged in substantial alignment, two diametrically arranged pairs of links at opposite sides of the axis of said shafts, the links of each pair being pivotally connected together, one link of each pair being pivotally connected to the driving shaft and the other pivotally connected to the driven shaft, a gear on each link which is pivotally connected to the driving shaft, and a gear axially arranged with respect to the driving shaft and meshing with said gears.

17. In a coupling for connecting together a driving shaft and a driven shaft arranged in substantial alignment, two diametrically arranged pairs of links at opposite sides of the axis of said shafts, the links of each pair being pivotally connected together, one link of each pair being pivotally connected eccentrically to the driving shaft and the other pivotally connected eccentrically to the driven shaft, a gear on each link which is pivotally connected to the driving shaft, and a larger gear axially arranged with respect to the driving shaft and meshing with said gears.

GUNNAR E. EHRLING.